S. G. RANDALL.
SEEDING MACHINE.

No. 25,443. Patented Sept. 13, 1859.

Witnesses:
Wm. H. Ticknor
Chas. F. Barton

Inventor:
S. G. Randall

UNITED STATES PATENT OFFICE.

S. G. RANDALL, OF NEW BRAINTREE, MASSACHUSETTS.

IMPROVEMENT IN SEEDING-MACHINES.

Specification forming part of Letters Patent No. 25,443, dated September 13, 1859.

*To all whom it may concern:*

Be it known that I, S. G. RANDALL, of New Braintree, in the county of Worcester and State of Massachusetts, have invented a new and Improved Seeding-Machine; and I do hereby declare that the following is a full, clear, and exact description of the same, reference being had to the annexed drawings, making a part of this specification, in which—

Figure 1:
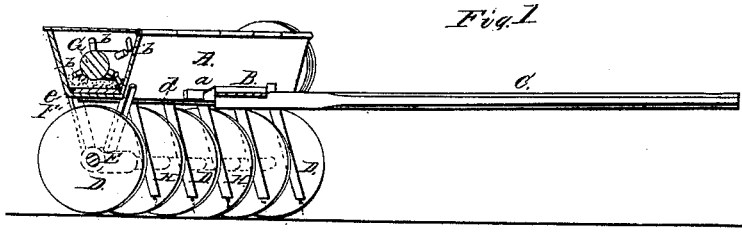
Figure 2:
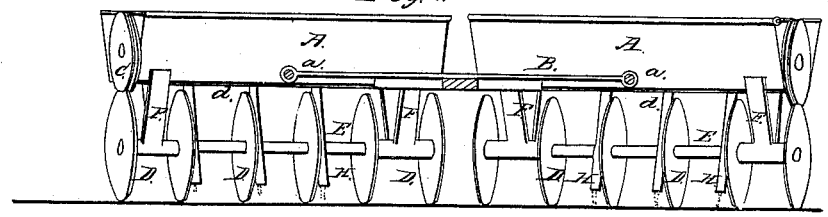
Figure 3:
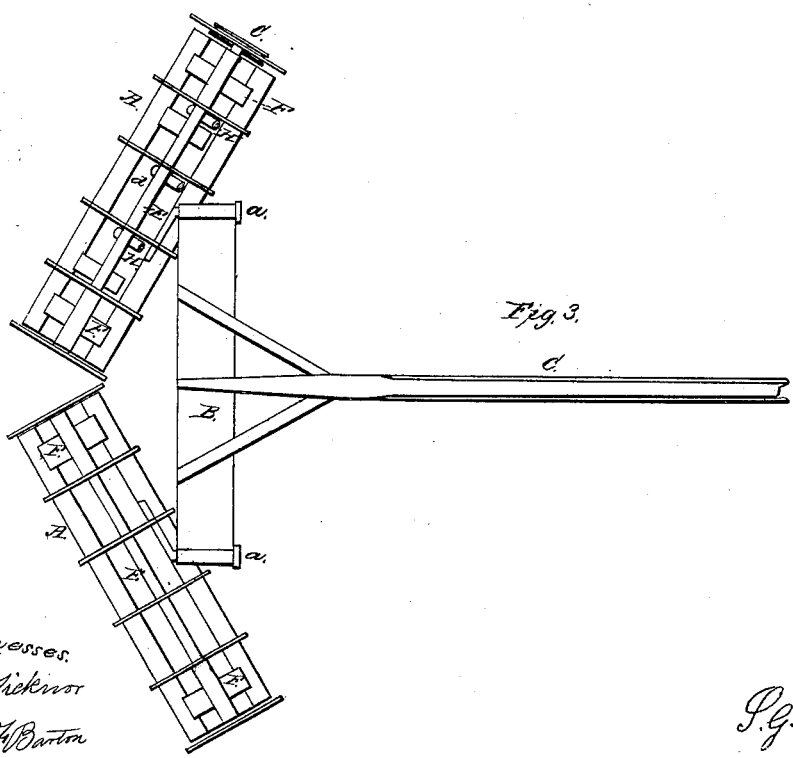

Figure 1 is a side sectional view of my invention; Fig. 2, a front view of the same; Fig. 3, an inverted plan of the same.

Similar letters of reference indicate corresponding parts in the several figures.

This invention consists in the employment or use of a novel harrowing device applied to and combined with a seed-box and seed-distributer, as hereinafter fully shown and described, whereby a very simple and efficient implement is obtained for the desired purpose—one that may be used on rough ground without being obstructed in its work or liable to be broken or injured.

To enable those skilled in the art to fully understand and construct my invention, I will proceed to describe it.

A A represent two seed-boxes, which may be of oblong quadrilateral taper form and connected by swivel-joints $a\ a$ to the ends of a plate or bar, B, to the center of which the draft-pole C is attached. The seed-boxes, it will be seen, have an oblique position relatively with each other, as shown clearly in Fig. 3. Each seed-box A is mounted on a series of plate-wheels, D, which are placed on a common axle, E. The seed-boxes are attached to their axle by proper supports, F, which are sufficiently high to allow the wheels D to work under them, as shown clearly in Figs. 1 and 2.

In each seed-box A a longitudinal shaft, G, is placed, said shafts being provided with radial arms $b$, as shown clearly in Fig. 1. The outer journal of each shaft G extends through the end of its seed-box, and a pulley, $c$, is placed thereon. These pulleys may be provided with grooved peripheries, into which the outermost wheel, D, of each series is fitted, and rotate the shafts G by friction only. Any other suitable means, however, may be employed for rotating the shafts G from the axles E.

The bottoms of the seed-boxes A are perforated, as usual, and when the device is intended to be used as a broadcast-seeding machine the seed is discharged through the perforations by the rotation of the shafts G, the arms $b$ acting as agitators to prevent the choking or clogging of the seed in the boxes and insure its even distribution. In case the device is to be used as a drill, a plate, $d$, is fitted underneath each seed-box A. These plates have seed-ducts or conveying-tubes H attached, which communicate with the seed-boxes and convey the seed therefrom into drills.

From the above description it will be seen that the axles E E of the plate-wheels D have an oblique position with the line of draft, and consequently as the machine is drawn along each wheel D performs the function of a plow, and the series of wheels operate as a gang-plow, but making comparatively small furrows, so as to cover the seed effectually, far more so than the ordinary harrows and various seed-covering devices that have passed under my observation. The plate-wheels D therefore perform two functions—that of wheels for the mounting of the seed-boxes and of rotating shares or coverers for covering the seed. Each seed-box, with its wheels, is allowed to rise and fall independently of the other, so as to conform to the inequalities of the ground. This result is obtained on account of the swivel-connections of the boxes A to the bar B.

The wheels D are far superior to the harrow or shares ordinarily used for covering seed, as the latter are greatly obstructed in rough ground by roots, weeds, and the like; but the wheels D pass over such obstructions or will cut through them, so that they can form no impediment to their progress. The implement also, as a whole, is rendered very compact, and it may be constructed at a very reasonable cost.

I do not claim the rotating armed shafts G in the seed-boxes A A, for they have been previously used, and are common to many seeding-machines; but I do claim as new, and desire to secure by Letters Patent—

The arrangement and combination of the series of plate-wheels D D, seed-boxes A, and horizontal bar B, substantially as herein shown and described, so that as the bar B is drawn along the plate-wheels shall assume an oblique position, as set forth.

S. G. RANDALL.

Witnesses:
WM. H. TICKNOR,
CHAS. F. BARTON.